Dec. 31, 1929.   C. R. HOUGHTON   1,741,774
DUST SEPARATOR
Filed Feb. 14, 1927    2 Sheets-Sheet 1

INVENTOR.
Carl R. Houghton,
BY
Hood & Hahn.
ATTORNEYS

Dec. 31, 1929.   C. R. HOUGHTON   1,741,774
DUST SEPARATOR
Filed Feb. 14, 1927   2 Sheets-Sheet 2
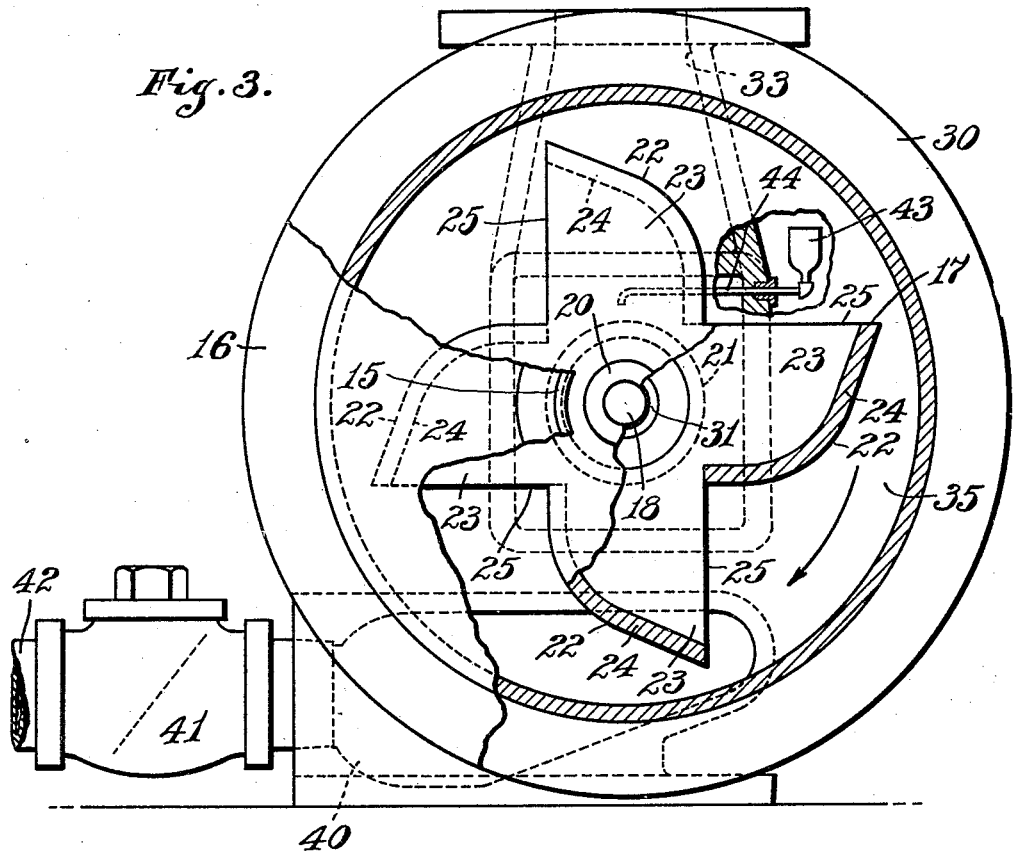
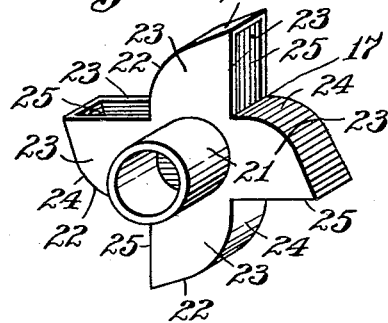
INVENTOR.
Carl R. Houghton,
BY
Hood & Hahn.
ATTORNEYS Patented Dec. 31, 1929

1,741,774

UNITED STATES PATENT OFFICE

CARL R. HOUGHTON, OF CONNERSVILLE, INDIANA, ASSIGNOR TO THE CONNERSVILLE BLOWER COMPANY, INC., OF CONNERSVILLE, INDIANA, A CORPORATION OF INDIANA

DUST SEPARATOR

Application filed February 14, 1927. Serial No. 167,890.

The object of my invention is to produce a simple and efficient device for use in a vacuum sweeper system, or other similar systems, in conjunction with an exhauster, for separating the dust and dirt from the air stream just prior to its arrival at the exhauster, the construction being such that the parts may be readily cleaned, and, in that type where water is used, does not depend upon close clearances for preventing the water from being drawn into the exhauster.

The accompanying drawings illustrate my invention.

Figure 1:
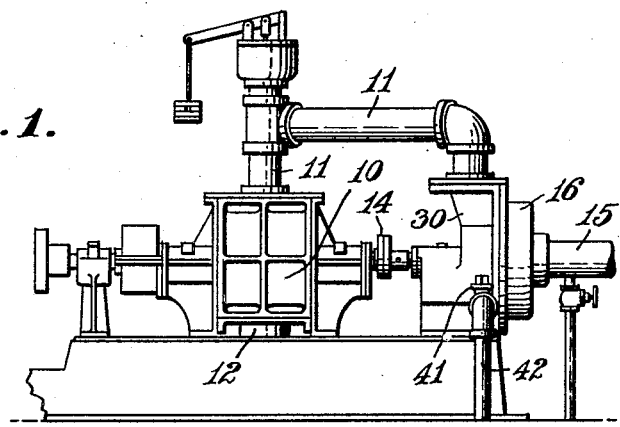
Figure 2:
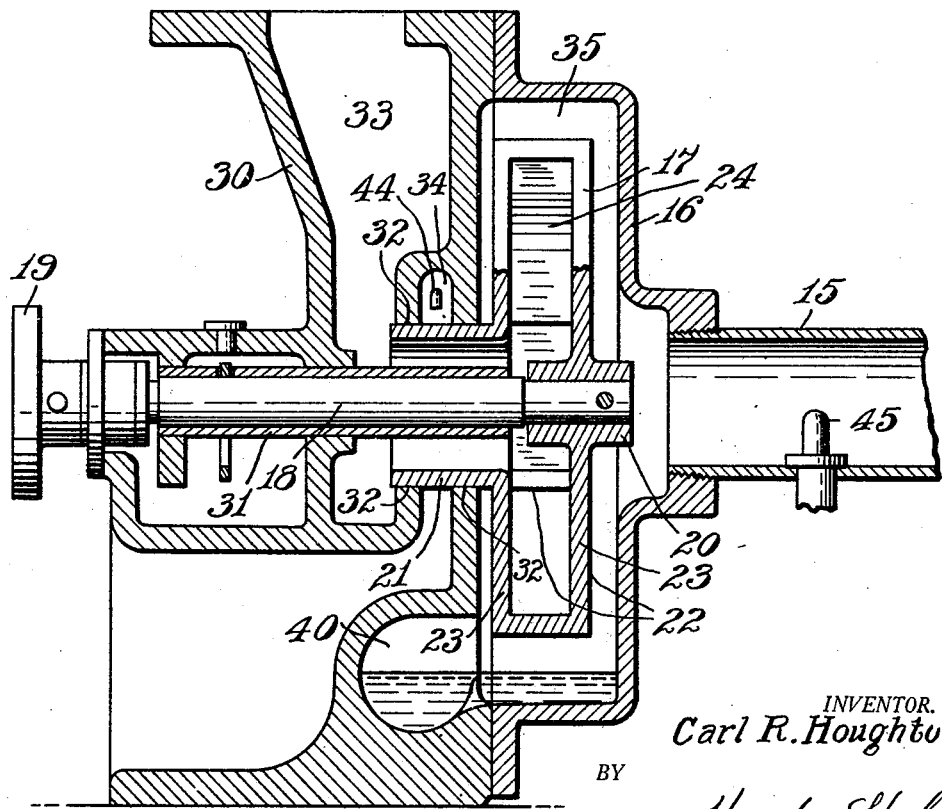

Fig. 1 is a side elevation of my improved separator in place in association with an exhauster of well-known type; Fig. 2 an axial section on a larger scale, of the improved separator shown in Fig. 1; Fig. 3 a fragmentary vertical section of the parts shown in Fig. 2; and Fig. 4 a perspective, on a smaller scale, of the runner or rotor of the separator.

In the drawings 10 indicates an exhauster of the well-known rotary lobed impeller type having an inlet pipe 11, discharge pipe 12 and rotary element (one of the impeller shafts, 14).

Leading from the piping system (not shown) from which the air or gas is to be exhausted, is a pipe 15 which delivers to a removable casing member 16 which forms a chamber in which rotor 17 is mounted, said rotor being carried by shaft 18 connected by coupling 19 with the rotary element 14 of the exhauster.

The rotor or runner 17 comprises a hub 20 attached to shaft 18, a tubular hub 21, and a plurality of hollow radial arms 22 lying between and connecting hubs 20 and 21. The arms 22 comprise side-walls 23 and rearwardly curved impeller walls 24 which connect walls 23, thus forming a hollow boxlike arm having an open rear face 25.

Member 17 is attached to and supported by a main body 30 provided with a bearing 31 for the support of shaft 18, said main body also having a bore 32 which receives and fits hub 21. Formed in body 30 is a chamber 33 which communicates with the interior of hub 21, an air space 34 being formed within body 30 around hub 21 between chamber 33 and the rotor chamber 35 formed by member 16.

Communicating with chamber 35 is a draw-off passage 40 which delivers through outwardly opening check valve 41 to the drain pipe 42.

Hub 21 may be lubricated from cup 43 through pipe 44.

Projected into pipe 15, closely adjacent member 16 is a water spray nozzle 45.

The operation is as follows:

The exhauster being put in motion and rotor 17 rotated in the direction indicated by the arrow in Fig. 3, a current of air will be drawn by the exhauster through pipe 15, rotor 17, chamber 33 and pipe 11 and the water sprayed from nozzle 45 will serve to entrap the dust and dirt which is in the air current. The rapid rotation of rotor 17 will serve to throw the water and dirt outwardly to the circumferential wall of chamber 35 and discharge it through the check valve 41 to draw pipe 42. The air will be drawn through openings 25 into and through the rotor.

It will be noticed that any leakage of water from chamber 35 to chamber 33 is prevented by air space 34, because the lower absolute pressures in chambers 33 and 35 result in a flow of air from air space 34 into chambers 33 and 35. This slight air leakage is not detrimental to the separation of the water from the air. If the clearance for any reason become excessive, the separating efficiency is not impaired.

I claim as my invention:

1. A separator comprising a chambered casing having an inlet, an outlet exhauster passage adapted to be connected to an exhauster, and an independent liquid outlet, a hollow rotor mounted in the chamber and having a hollow hub extending through the wall of said chamber and connecting the exhauster passage with the interior of the rotor, said rotor having inlet openings connecting its interior with the chamber of the casing.

2. A separator comprising a chambered casing having an inlet, an outlet exhauster passage adapted to be connected to an exhauster, and an independent liquid outlet, a hollow rotor mounted in the chamber and having a hollow hub connecting the exhauster passage with the interior of the rotor, said rotor having inlet openings connecting its interior with the chamber of the casing, and facing away from the direction of rotation and also having impeller surfaces.

3. A separator comprising a chambered casing having an inlet, an outlet exhauster passage adapted to be connected to an exhauster, and an independent liquid outlet, a hollow rotor mounted in the chamber and having a hollow hub connecting the exhauster passage with the interior of the rotor, said rotor having inlet openings connecting its interior with the chamber of the casing, said casing having a passage to atmosphere interposed between the rotor chamber and the exhauster passage and through which the hub of the rotor is projected.

4. A separator comprising a chambered casing having an inlet, an outlet exhauster passage adapted to be connected to an exhauster, and an independent liquid outlet, a hollow rotor mounted in the chamber and having a hollow hub connecting the exhauster passage with the interior of the rotor, said rotor having rearwardly set inlet openings connecting its interior with the chamber of the casing and facing away from the direction of rotation, and also having impeller surfaces, said casing also having a passage to atmosphere interposed between the rotor chamber and the exhauster passage and through which the hub of the rotor is projected.

5. A separator comprising a casing having a rotor chamber having an inlet, and an outlet adapted to be connected to an exhauster, and a hollow rotor mounted in said casing, said rotor having a plurality of radially extending hollow fingers each having an opening through a face facing opposite to the direction of rotation of the rotor, the leading face being imperforate, and means for producing a current of air through said rotor chamber and rotor.

6. A separator comprising a casing having a rotor chamber having an inlet, and an outlet adapted to be connected to an exhauster, and a hollow rotor mounted in said casing, said rotor having a plurality of radially extending hollow fingers each having an opening through a face facing opposite to the direction of rotation of the rotor, the leading face being imperforate, and also having a tubular hub connecting the interior of the rotor with the exhauster.

7. A separator comprising a casing having a rotor chamber having an inlet, and an outlet adapted to be connected to an exhauster, and also having a passage interposed between the rotor chamber and exhauster passage and leading to atmosphere, and a hollow rotor mounted in said casing, said rotor having a plurality of radially extending hollow fingers each having an opening through a face facing opposite to the direction of rotation of the rotor, and also having a tubular hub connecting the interior of the rotor with the exhauster, said hub projecting through the passage leading to atmosphere.

In witness whereof, I have hereunto set my hand at Connersville, Indiana, this tenth day of February, A. D. one thousand nine hundred and twenty-seven.

CARL R. HOUGHTON.